US010579346B2

United States Patent
Yan

(10) Patent No.: US 10,579,346 B2
(45) Date of Patent: *Mar. 3, 2020

(54) MOBILE ACCESSIBILITY EVALUATION FROM APPLICATION BINARY

(71) Applicant: International Business Machines Corporation, Armonk, NY (US)

(72) Inventor: Shunguo Yan, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/059,025

(22) Filed: Aug. 8, 2018

(65) Prior Publication Data

US 2018/0349112 A1 Dec. 6, 2018

Related U.S. Application Data

(63) Continuation of application No. 15/379,842, filed on Dec. 15, 2016, now Pat. No. 10,083,015.

(51) Int. Cl.
*G06F 9/44* (2018.01)
*G06F 8/38* (2018.01)
*G06F 11/36* (2006.01)
*G06F 9/451* (2018.01)
*G06F 11/07* (2006.01)

(52) U.S. Cl.
CPC ............... *G06F 8/38* (2013.01); *G06F 9/451* (2018.02); *G06F 11/0766* (2013.01); *G06F 11/3696* (2013.01)

(58) Field of Classification Search
CPC .............. G06F 8/38; G06F 8/40; G06F 8/52
USPC ................................................ 717/106-115
See application file for complete search history.

(56) References Cited

U.S. PATENT DOCUMENTS

| 6,115,710 A * | 9/2000 | White ................... G06F 8/38 |
| 6,230,312 B1 * | 5/2001 | Hunt ................... G06F 9/465 |
| | | 717/108 |
| 6,427,230 B1 * | 7/2002 | Goiffon ................ G06F 8/36 |
| | | 717/108 |
| 6,986,132 B1 * | 1/2006 | Schwabe .............. G06F 8/52 |
| | | 717/166 |
| 7,386,833 B2 * | 6/2008 | Granny ............ G06F 17/5027 |
| | | 717/109 |

(Continued)

OTHER PUBLICATIONS

Pham et al, "Model-Based Whitebox Fuzzing for Program Binaries", ACM, pp. 543-553 (Year: 2016).*

(Continued)

*Primary Examiner* — Anil Khatri
(74) *Attorney, Agent, or Firm* — Garg Law Firm, PLLC; Rakesh Garg; Mercedes L. Hobson

(57) ABSTRACT

Interface changing events are identified in the binary executable of an application. Code modules that are directed at evaluating accessibility requirements pertaining to the identified interface changing events are generated. A modified binary of the application is created with the modified binary including the binary executable and the generated code modules. When one of the interface changing events is identified, one of the generated code modules executes and returns a set of accessibility data that pertains to the interface changing event.

20 Claims, 11 Drawing Sheets

(56) References Cited

U.S. PATENT DOCUMENTS

| | | | | | |
|---|---|---|---|---|---|
| 7,533,365 | B1* | 5/2009 | Hogstrom | | G06F 8/10 |
| | | | | | 717/104 |
| 7,546,567 | B2* | 6/2009 | Cheon | | G06F 17/5077 |
| | | | | | 716/113 |
| 7,665,062 | B1* | 2/2010 | Bauer | | G06F 8/34 |
| | | | | | 717/105 |
| 7,784,026 | B1* | 8/2010 | Wong | | G06F 9/454 |
| | | | | | 717/109 |
| 7,877,727 | B2* | 1/2011 | Sharp | | G06F 8/38 |
| | | | | | 717/106 |
| 8,429,394 | B1* | 4/2013 | Natoli | | G06F 9/44547 |
| | | | | | 713/100 |
| 8,719,772 | B2* | 5/2014 | Singla | | G06F 8/36 |
| | | | | | 717/106 |
| 8,819,624 | B2* | 8/2014 | Hou | | G06F 9/455 |
| | | | | | 715/273 |
| 8,875,091 | B1* | 10/2014 | Rouleau | | G06F 8/10 |
| | | | | | 717/101 |
| 9,026,994 | B2* | 5/2015 | Zhang | | G06F 8/70 |
| | | | | | 717/120 |
| 9,223,554 | B1* | 12/2015 | Lawson | | G06F 8/54 |
| 9,448,788 | B1* | 9/2016 | Barua | | G06F 8/70 |
| 10,152,313 | B1* | 12/2018 | Hartmann | | G06F 8/41 |
| 10,339,837 | B1* | 7/2019 | Gounares | | G09C 1/00 |

OTHER PUBLICATIONS

Borin et al, "TAO: Two-level Atomicity for Dynamic Binary Optimizations", ACM, pp. 12-21 (Year: 2010).*

Xiaobing et al, "Research on the vulnerability predicting analysis model for binary executables", IEEE, pp. 299-304 (Year: 2016).*

Harris et al, "Practical Analysis of Stripped Binary Code", ACM, pp. 63-68 (Year: 2005).*

Ringenberg et al, "Intrinsic Checkpointing: A Methodology for Decreasing Simulation Time Through Binary Modification", IEEE, pp. 1-11 (Year: 2005).*

Baiocchi et al, "Enabling Dynamic Binary Translation in Embedded Systems with Scratchpad Memory", ACM, pp. 1-33 (Year: 2012).*

Payer et al, "Generating Low-Overhead Dynamic Binary Translators", ACM, pp. 1-14 (Year: 2010).*

Zhang et al, "Adaptive Cut Generation for Improved Linear Programming Decoding of Binary Linear Codes", IEEE, pp. 1638-1642 (Year: 2011).*

* cited by examiner

MOBILE ACCESSIBILITY EVALUATION FROM APPLICATION BINARY

BACKGROUND OF THE INVENTION

Technical Field

The present invention relates generally to a method, system, and computer program product for evaluating the user interfaces used on computing devices. More particularly, the present invention relates to a method, system, and computer program product for modifying the binary of app executables in order to perform runtime evaluation of user interfaces for accessibility compliance.

Description of Related Art

Almost all data processing systems, including mobile devices, include some manner of interacting with a user. For example, a display device is used with a data processing system for presenting a visual user interface to a user, an audio device is used with the data processing system for presenting audible user interface to the user, and tactile devices are used for presenting a tactile interface to the user. Within the scope of the disclosure, the term "user interface" refers to a user interface of any of these types or other types as may be suitable for a particular implementation.

Accessibility features are features of a user interface that are designed or configured to assist a user in interacting with a particular aspect of a given user interface. For example, a large default font size is an example accessibility feature that makes interacting with a user interface easier for those users who have weak eyesight. Similarly, an audio readout accessibility feature assists users with vision impairment to interact with a user interface. A tactile feedback, such as vibration of a mobile device, is another example accessibility feature for users who have temporary, circumstantial, or permanent auditory impairment. Such features benefit users experiencing impairments, whether temporary, circumstantial, preferential, or permanent.

Many accessibility features are presently available for use in user interface designs. Often, an application executing on a data processing system presents several user interfaces to the user during the course of using the application. For example, numerous user interfaces in the forms of screen layouts, plugin applications, and tools are presented or called upon during the course of a user using a software application.

SUMMARY

An embodiment provides a method implemented by an information handling system that includes a processor and a memory accessible by the processor. The embodiment identifies one or more interface changing events in the binary executable of an application. The embodiment generates one or more code modules, where each of the generated code modules is directed at evaluating one or more accessibility requirements pertaining to one or more of the identified interface changing events. The embodiment creates a modified binary of the application, where the modified binary includes the binary executable and the generated code modules. The embodiment executes the modified binary, where upon execution of a selected one of the identified interface changing events, a selected one of the generated code modules is executed and returns a set of accessibility data pertaining to the selected interface changing event.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
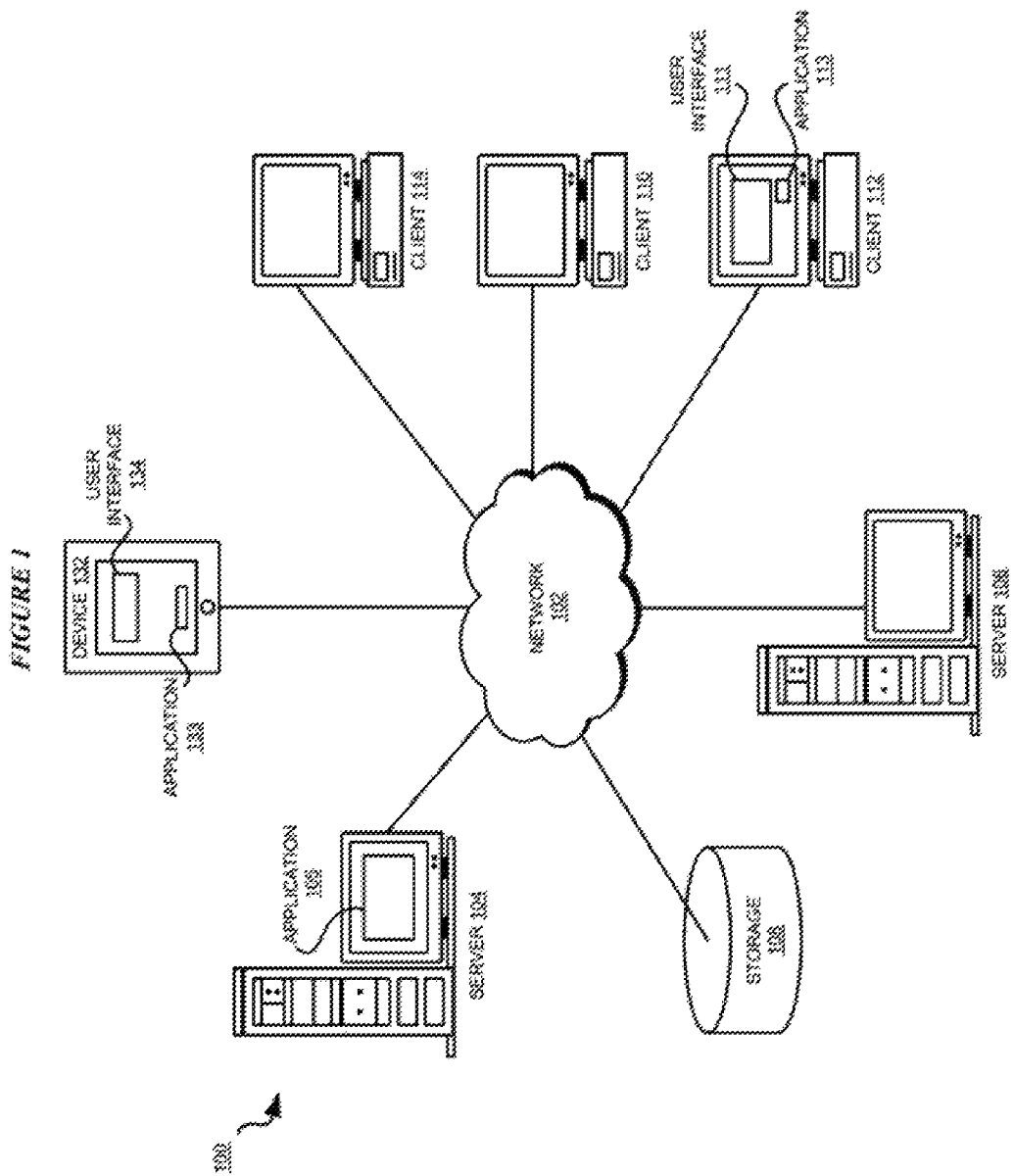
FIG. 1 depicts a block diagram of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Within the scope of this disclosure, the term "accessibility" includes not only the considerations in making a user interface usable despite some disability of a user, but also considerations for improving the usability of a user interface generally. To such end, the term "accessibility" is inclusive of other terms, such as "usability".

An element of a user interface (UI) is a part, portion, or component used in the UI. A UI element is often, but need not necessarily be, visible or perceptible to a user. A UI element has associated therewith a set of one or more attributes. A UI element can depend on or relate to another UI element such that an attribute of the UI element is changed, restricted, overridden, controlled, limited, manipulated, guided, or otherwise affected by an attribute of the related UI element. An accessibility feature of a UI is a result of adding, removing, or modifying one or more elements of the UI, adjusting one or more attributes of the one or more elements of the UI, or a combination thereof.

The illustrative embodiments recognize that accessibility features of a UI are largely implementation dependent, and are generally decided by software manufacturers and software developers. Standards and specifications for some accessibility features presently exist, with new accessibility features and their specifications evolving with the advancement of technology.

The illustrative embodiments further recognize that a UI is also dependent upon the hardware platform, hardware-software combination, or both, (collectively, hereinafter, "native infrastructure") on which the UI is to be presented. For example, a UI that is to be presented on a device using iOS™ can, and often does, implement UI elements differently from an implementation of the same UI elements for the Android™ platform (iOS is a trademark of Cisco Systems, Inc. licensed to Apple Inc., and Android is a trademark of Google Inc., in the United States and in other countries).

A native element is a UI element that is implemented in the native infrastructure, independent of particular UIs that are presented on the given native infrastructure. A native element is created using a definition provided by the native infrastructure.

Many types of native elements are possible and are contemplated within the scope of the illustrative embodiments. For example, a button artifact on a user interface can be a native element as well, such as a "Home" button, a "start" button, a "back" button, and so on. Slider controls, checkboxes, and other graphical artifacts can be present on a user interface in a similar manner.

Generally, a native infrastructure specifies a class hierarchy where some classes in the hierarchy encapsulate native UI elements, and other classes encapsulate other native infrastructure functions such as services provided, application programming interface (API) presented, etc. In other words, a native element can be created by instantiating a corresponding class from the native class hierarchy.

The illustrative embodiments recognize that a user can extend the system-provided native elements to define extensions of the native elements in the form of one or more extended classes. An extended element inherits the properties of one or more parent native element in the hierarchy by adding one or more new attributes or behaviors to the parent native element, by modifying one or more existing attributes or behaviors of the parent native element, or some combination thereof. In other words, an extended element is a user-defined extension of the native element with new features. For example, the native element may be a button, which produces a rectangular button UI element with text label, but a user may define a newButton derived from the native button. The newButton element produces a circular button with an animated graphic label.

An element that extends a native element according to a user-provided attribute or behavior is interchangeably referred to hereinafter as a user-defined element or a user-extended element. A class corresponding to a user-defined or user-extended element is interchangeably referred to hereinafter as a user-defined class or a user-extended class.

The illustrative embodiments recognize that the manner in which the UI elements are eventually presented on a particular device can be influenced or affected by how the native and user-defined elements are implemented on that device's native infrastructure. For example, if a button native element defines a background color, the color scheme of the circular button user-defined element may override the background color such that the new color is not distinguishable from a background color to a color-blind user. As another example, if a native element is a button that has to be separated from other UI elements by at least a threshold distance, a user-defined button element, when presented using the native infrastructure, may appear closer than the threshold distance from another UI element.

Presently, verifying compliance of an accessibility feature with a specification is also dependent upon the participation of the software manufacturer, the software developer, one or more entities involved in the development of a native infrastructure, and/or the user. For example, some software manufacturers include accessibility testing as a part of software testing activity and include an accessibility compliance report generated therefrom with the software. Some other software products are distributed with manufacturer-supplied accessibility testing tools bundled with the software. Some entities test native infrastructure for accessibility compliance or provide testing tools for such testing.

Many accessibility features depend on, or are a result of rules. For example, a rule interpreted from a government law, an industrial standard, a usability specification, or industry best practice often forms a basis for an accessibility feature.

The illustrative embodiments recognize that many entities can contribute accessibility compliance rules at any given time. For example, different standards bodies can promulgate or recommend different sets of accessibility compliance rules as applicable to different accessibility features, different geographical locales, different devices or technological components involved, government or governing regulations, and many other factors. As another example, an association of interested parties, e.g. an association of software manufacturers, software developers, users, device manufacturers, native infrastructure developers, or public interest groups, can similarly contribute one or more sets of accessibility compliance rules, policies, preferences, guidelines, or recommendations. An accessibility compliance rule, policy, preference, guideline, regulation, recommendation, or specification is collectively referred to herein as an accessibility compliance rule or simply a rule.

Furthermore, such sets of rules can be overlapping, can have an order of preference or application, can have different effective periods, can be provided in different forms, and can be differently applicable or not applicable according to circumstances. Additionally, an entity may wish to add supplementary rules, prioritize certain rules, or choose to ignore other rules generally or in certain conditions. Various rule sets may also apply differently depending on device usage, markets, or device capabilities. The illustrative embodiments recognize that the presently available methods of accessibility compliance checking are not conducive to making an on-demand, unbiased, comprehensive, current, and selective accessibility compliance check of a UI.

The illustrative embodiments recognize that because of such disconnected and diverse ways of testing or checking for accessibility compliance, the presently available methods for accessibility compliance checking are non-uniform across applications and native platforms. For example, different native platforms implement the same UI elements differently. Thus, it is not easy to select the compliance rules that apply to a UI element because the UI element is implemented differently on different platforms.

This problem is further exacerbated when user-defined UI elements are involved in the UI. Again, the same user-defined UI element may be implemented differently on different platforms and different manufacturer or developers may code similar user-defined elements differently.

The illustrative embodiments further recognize that many UI elements are not available a priori for accessibility compliance checking. Often, a UI element is determined, selected, instantiated, and rendered at runtime. Therefore, different times and circumstances of presenting the same UI may cause different UI elements to be included on the UI. The illustrative embodiments further recognize that the presently available accessibility compliance checking methods are insufficient to determine whether the collection of native and user-defined UI elements presented in a UI at runtime are accessibility complaint.

The illustrative embodiments used to describe the invention generally address and solve the above-described problems and other problems related to accessibility compliance checking of UI features. The illustrative embodiments provide a method, system, and computer program product for runtime evaluation of user interfaces for accessibility compliance.

An embodiment can be implemented as a software application. The application implementing an embodiment can be configured as a modification of an existing UI presentation application such as a browser, as a separate application that operates in conjunction with an existing UI presentation application, a standalone local or remote application, or some combination thereof.

An embodiment collects the accessibility compliance checklists, specifications, guidelines, or other accessibility requirements from one or more sources. The embodiment transforms the accessibility compliance requirements in the form of a set of accessibility compliance rules (hereinafter, "rule" or "rules"). The embodiment further groups the set of rules such that a subset of rules applies to a category of UI elements.

A category of UI elements is a grouping of UI elements according to their accessibility requirements; in other words, UI elements with the same accessibility requirements are grouped in the same category. As some non-limiting examples, UI elements that accept a pointer input, such as buttons of various types, may be categorized into one category because they have the same accessibility requirements, but an image button may not be in the same category because it does not have a text label as a normal button does. UI elements that accept textual input, such a form fields, text boxes, password fields, and the like, may be categorized into another category. UI elements that provide selections, such as dropdown lists, menus, and the like, may belong in another category.

These examples of categories are not intended to be limiting. From this disclosure, those of ordinary skill in the art will be able to conceive many other categories and manners of categorizing UI elements, and the same are contemplated within the scope of the illustrative embodiments.

An embodiment obtains a set of interface elements, to wit, elements used in a UI, and the native class hierarchy for the elements from a native platform. The embodiment analyzes each interface element and the corresponding one or more accessibility requirements to determine a category for the element. For user-defined interface elements, the embodiment uses the class hierarchy to determine their category. The embodiment saves the category information corresponding to the interface elements in any suitable implementation-specific manner, including but not limited to within each such element.

At runtime, an embodiment determines a UI that is presented at a native platform. The embodiment retrieves, accesses, or otherwise receives a UI element hierarchy specific to the UI from the platform on which the UI is being presented. This UI-specific element hierarchy can include one or more element derived from the native class hierarchy of that platform, and any number of extended elements derived from one or more such classes of the native class hierarchy.

For a UI element on the UI, the embodiment determines whether the element is a native element or a user-defined element. The embodiment identifies an interface element to which the element corresponds. If the element is a native element, the element has been already categorized as described herein. The embodiment selects the category of the element.

If the element is a user-defined element, the class corresponding to the element is an extended class, which has a parent class in the native class hierarchy of that platform. The parent element corresponding to the parent class may be a direct parent of the extended class, or one or more additional parent-child relationships may exist in the class hierarchy of the UI between the extended class and the parent class. Furthermore, the extended class may have more than one parent class from which the extended class derives via multiple inheritance.

The embodiment locates one or more parent classes of the extended class. Because each such parent class is present in the native class hierarchy, each such parent class may have been already categorized as described herein. The embodiment selects the category of each parent class as a category of the element. In case of multiple parent classes of the extended class, the UI element corresponding to the extended class can become associated with multiple categories in this manner. If the parent class has not been categorized, the user-defined element may contain user drawing and other user-defined UI properties, and the embodiment selects the "Custom" category that has a defined set of accessibility rules.

Proceeding in this manner, an embodiment is able to categorize all or most of the UI elements at runtime in a given UI. Once a category is available for a UI element—whether a native element or a user-defined element, an embodiment applies the subset of rules that correspond to the category. The embodiment determines from the application of a rule whether the element complies with the accessibility requirement of the rule. If the element fails to comply with the accessibility requirement of a rule, the embodiment adds information about the element and the violated rule to an accessibility violation report.

A method of an embodiment described herein, when implemented to execute on a device or data processing system, comprises substantial advancement of the functionality of that device or data processing system in runtime evaluation of user interfaces for accessibility compliance. For example, presently available accessibility rules require a priori availability of a UI to determine whether the UI complies with the rules. An embodiment provides a method for performing accessibility compliance checking at runtime. This manner of runtime evaluation of user interfaces for accessibility compliance is unavailable in the presently available methods. Thus, a substantial advancement of such devices or data processing systems by executing a method of an embodiment is in ensuring that the native and user-defined UI elements that are created at runtime can be evaluated and reported for accessibility compliance.

The illustrative embodiments are described with respect to certain UI, native and user-defined UI elements, native platforms, native class hierarchy, classes, extended classes, accessibility compliance rules, categories, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
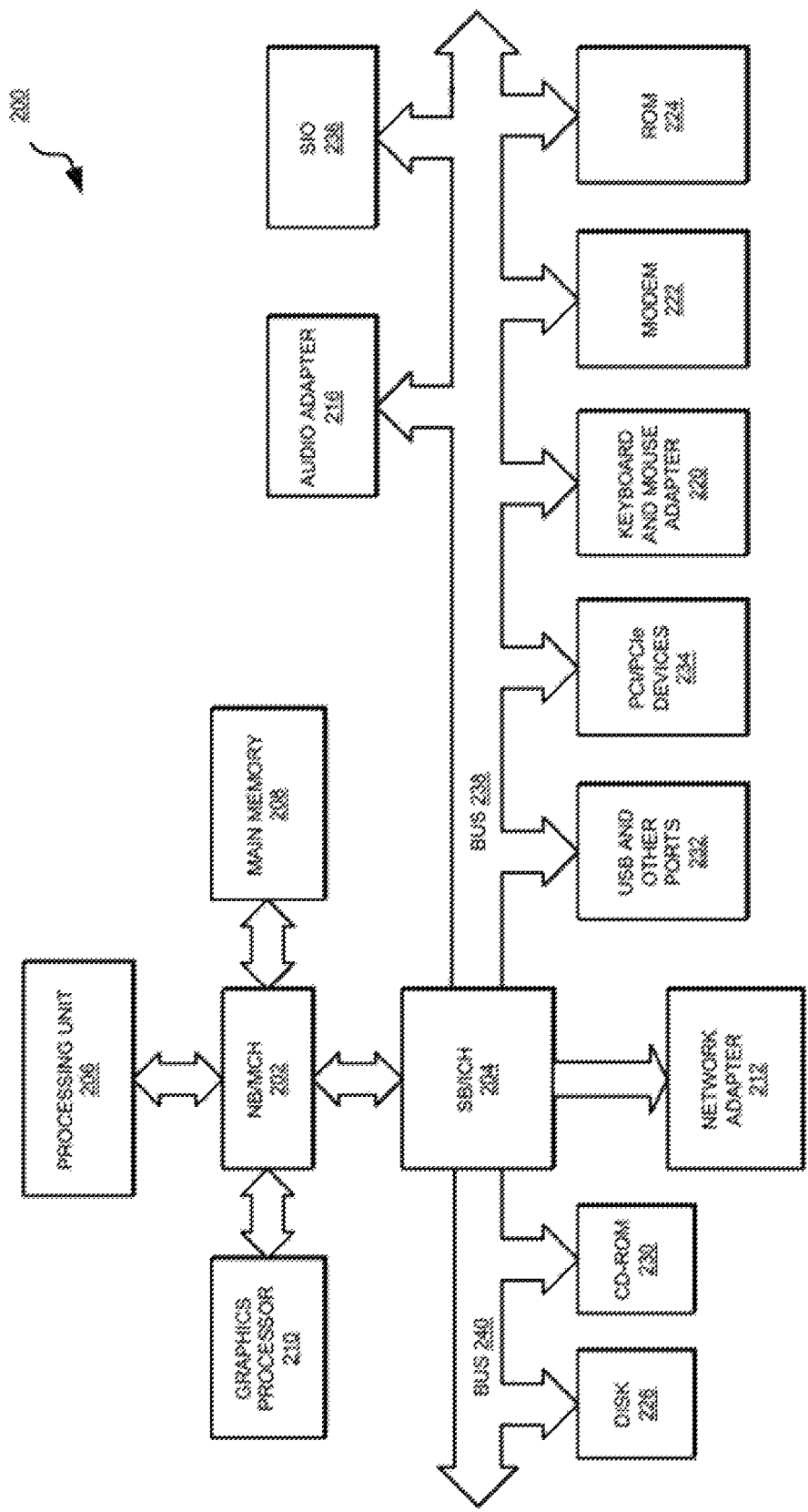
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. For example, application 105 collects the accessibility compliance requirements, produces the accessibility compliance rules, categorizes the rules, collects the native class hierarchies for the various native platforms, and categorizes the classes in those native class hierarchies. Application 105 can supply the categorized rules and class category information to client-side applications, such as applications 113 and 133. In such cases, applications 113 and 133 perform the runtime operations according to the various embodiments. In some other cases, applications 113 and 133 are configured to perform the operations described with respect to application 105 as well as the runtime operations, all on the client-side, such as on client 112 and device 132, respectively. Generally, within the scope of the illustrative embodiments, the operations of the embodiments described herein can be distributed between a server-side application such as application 105 and client-side applications, such as application 113 or 133, in any suitable manner, including all operations being performed on the server-side or on the client-side, or an operation being implemented in the form of software as a service.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 105, 113, and 133 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3A:
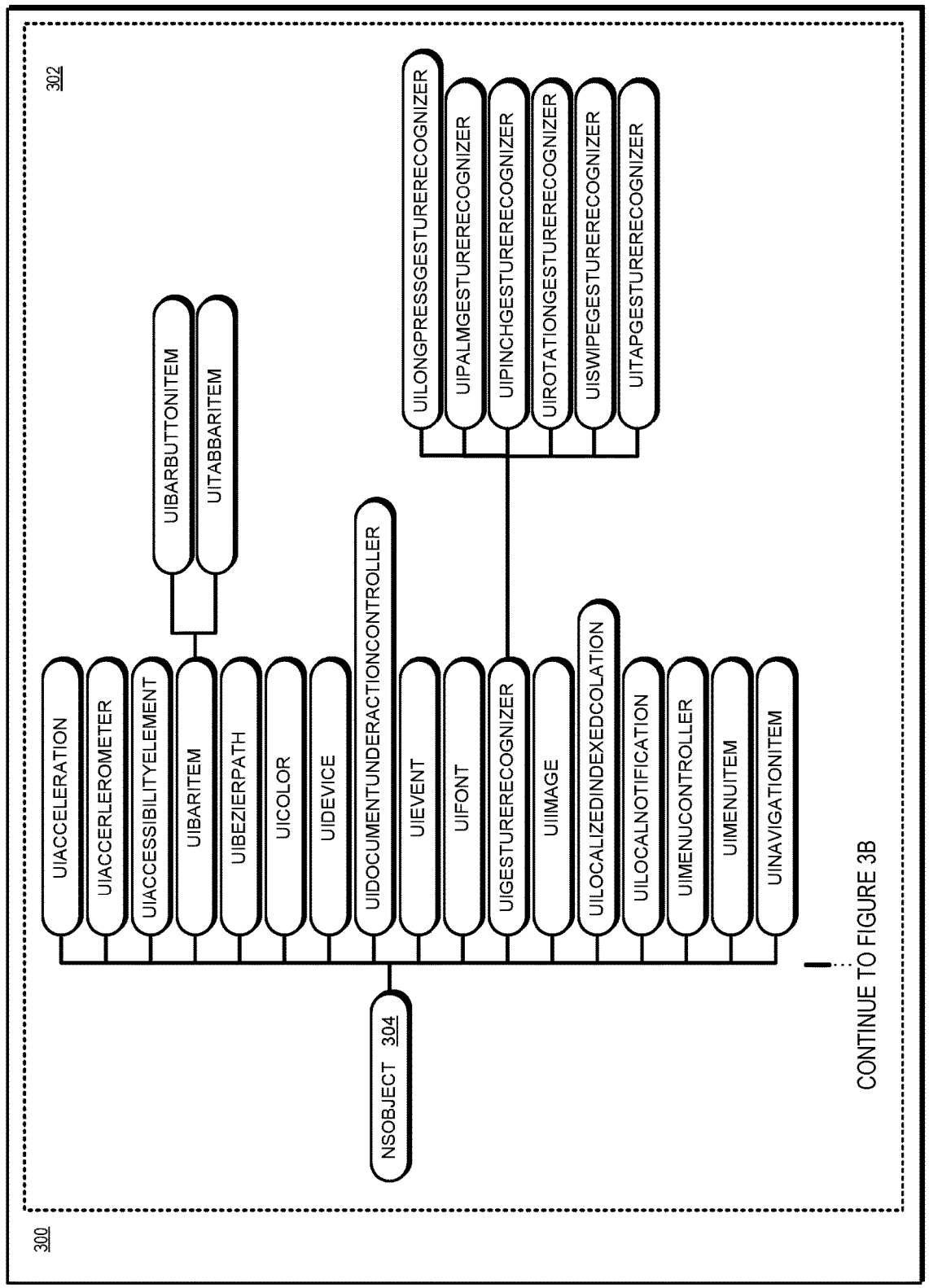
FIG. 3A depicts one portion of an example class hierarchy that can be used in accordance with an illustrative embodiment.
Figure 3B:
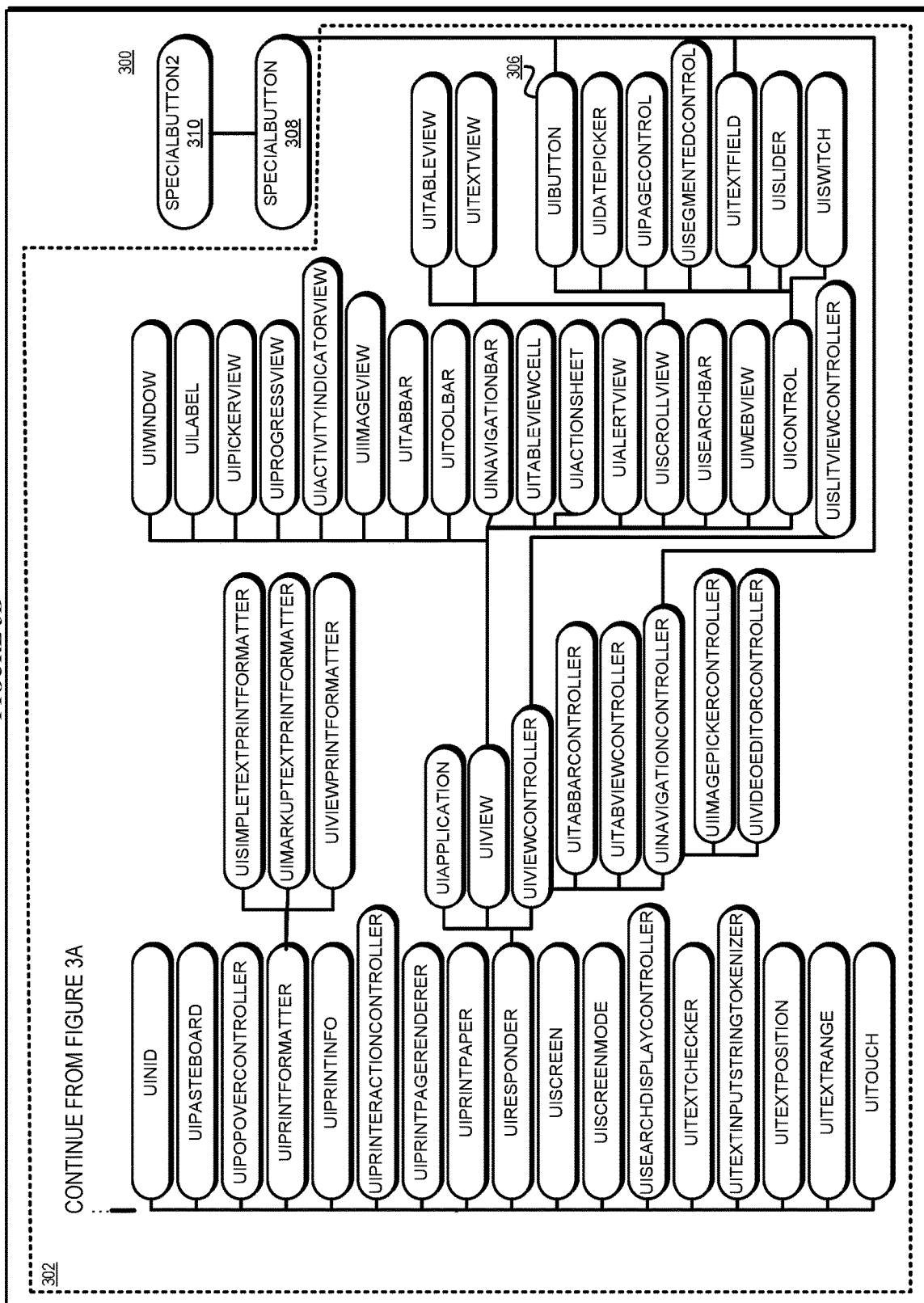
FIG. 3B depicts another portion of an example class hierarchy that can be used in accordance with an illustrative embodiment.

With reference to FIG. 3A-3B, these figures together depict an example class hierarchy that can be used in accordance with an illustrative embodiment. The hierarchy portion depicted in FIG. 3A continues in FIG. 3B as shown. Class hierarchy 300 includes native class hierarchy 302. Native class hierarchy 302 is used in an iOS native platform. Native class hierarchy 302 is rooted in class 304, and includes native class 306 called "UIButton".

As described herein, a developer can create an extended class to create a user-defined element. As a non-limiting example, class hierarchy 300 shows that user-defined class 308 called "SpecialButton" has been derived from native classes UI Button, UITextField, and UINavigationController. User-defined class 310 called "SpecialButton2" is further derived from user-defined class 308.

Figure 4:
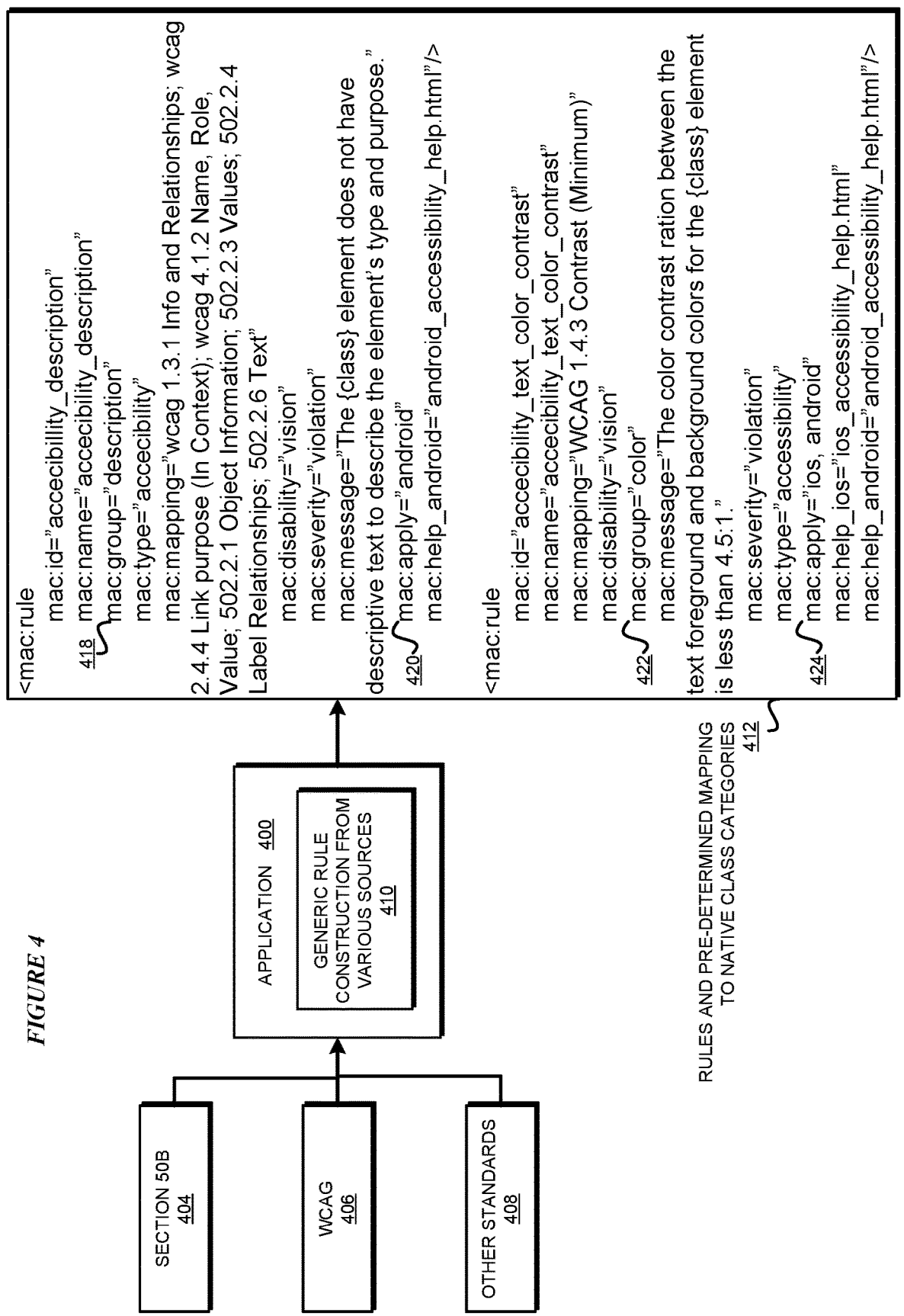
FIG. 4 depicts a block diagram of an example configuration for producing categories of rules in accordance with an illustrative embodiment.

With reference to FIG. 4, this figure depicts a block diagram of an example configuration for producing categories of rules in accordance with an illustrative embodiment. Application 402 is an example of application 105 in FIG. 1.

Application 402 receives accessibility compliance requirements from one or more sources, such as from any or all of sources 404, 406, and 408. Component 410 constructs logic for one or more accessibility compliance rules based on the requirements from inputs 404, 406, and/or 408. For example, component 410 constructs code or pseudo code for a rule.

Component 410 produces a set of rules in this manner. Component 410 further analyzes a rule and the rule's application to one or more categories of the UI elements, each rule may apply to one or more categories of UI elements. A rule can participate in one or more subsets, and therefore be associated with one or more categories. Accordingly, each category of UI elements may have a subset of applicable rules.

Output 412 is a set of rules produced by the operation of component 410 in this manner. As an example, output 412 depicts two rules 414 and 416. Rule 414 applies to a description attribute of a UI element (mac:group="description")(418) presented on Android platform (mac:apply="android")(420). Rule 416 applies to a color attribute of a UI element (mac:group="color")(422) presented on iOS platform and Android platform (mac:apply="ios,android")(424).

In one example embodiment, a category of UI elements may include those elements that must have a descriptive text associated with them as one of their attributes. Rule 414 applies to the "description" related attributes, and therefore applies to such UI elements on Android platform. In another example embodiment, a category of UI elements may include those elements that must have a color associated with them as one of their attributes. Rule 416 applies to the "color" related attributes and therefore applies to such UI elements on iOS or Android platforms.

These examples of rules, categories, and manner of categorizing the rules are not intended to be limiting. From this disclosure, those of ordinary skill in the art will be able to conceive many other rules, categories, and manner of categorizing the rules, and the same are contemplated within the scope of the illustrative embodiments. For example, within the scope of the illustrative embodiments, a category may be defined in other ways that based on an attribute of an element, as in the above examples. For example, a category may be a type of the element, such as a "button" category or a "list" category. Because a button UI element has a description attribute and a color attribute, rule 414 and 416 would both belong to the Button category.

Figure 5:
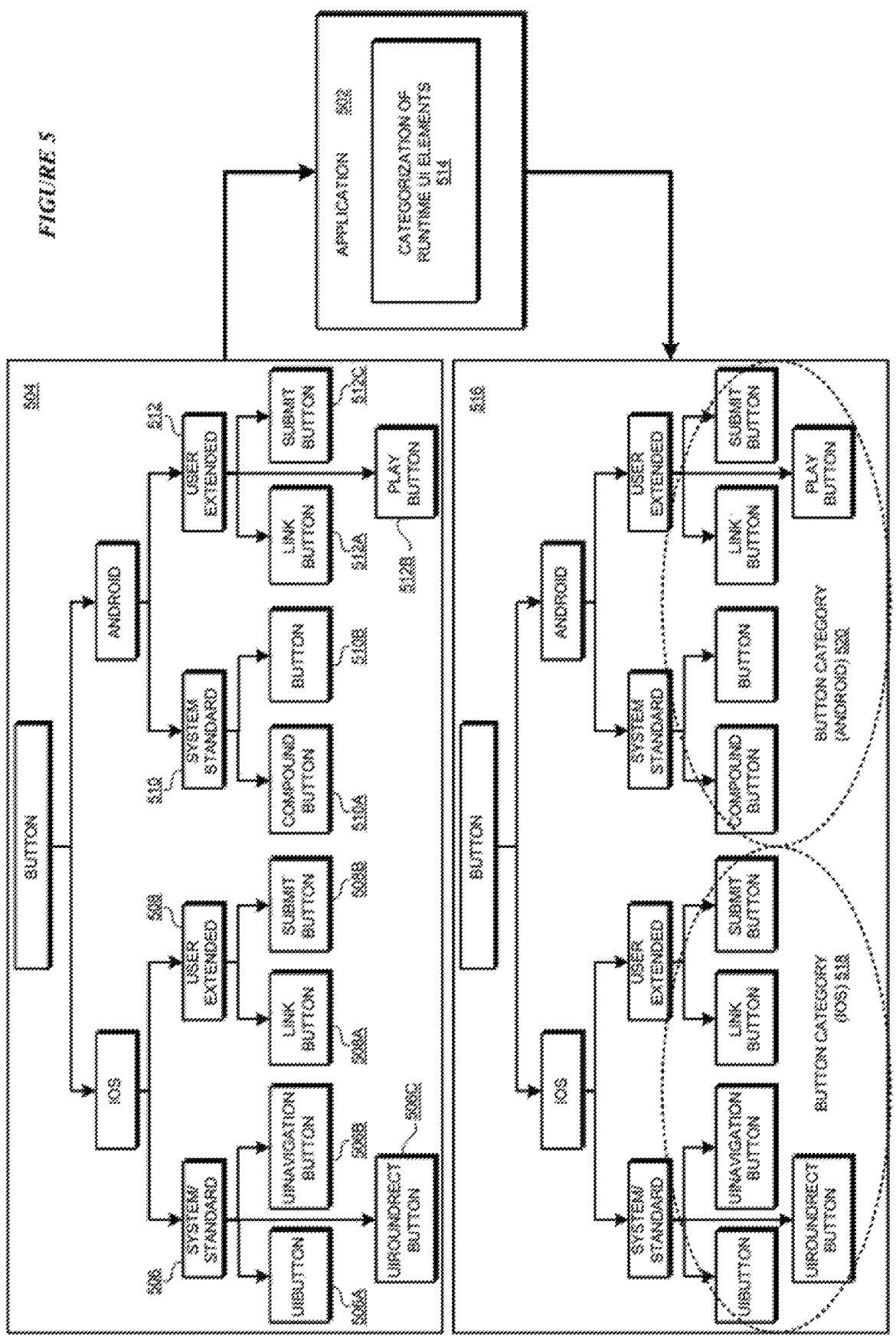
FIG. 5 depicts a block diagram of an example configuration for determining categories of UI elements in accordance with an illustrative embodiment.

With reference to FIG. 5, this figure depicts a block diagram of an example configuration for determining categories of UI elements in accordance with an illustrative embodiment. Application 502 is an example of application 402 in FIG. 4 with additional features as described herein.

Application 502 receives as input element hierarchy 504. Element hierarchy 504 corresponds to a set of UI elements presented in a UI at runtime. Not shown here is the step where application 502 has already categorized the user-defined elements according to classes in a native class hierarchy for the platform, as described herein. Element hierarchy 504 shows some elements in the iOS platform, e.g., elements 506 and the elements 506A, 506B, and 506C deriving therefrom. Element hierarchy 504 also shows some elements that a developer has created for the iOS platform, e.g., element 508 and the elements 508A and 508B deriving therefrom.

Ch 504 also shows a similar hierarchy for Android platform. For example, element 510 is an element in the Android platform, with elements 510A and 510B deriving therefrom. Element hierarchy 504 also shows some elements that a developer has created for the Android platform, e.g., element 512 and the elements 512A, 512B, and 512B deriving therefrom.

Component 514 categorizes the elements in element hierarchy 504. For example, for the elements in element hierarchy 504 which appear in the native element hierarchy of the corresponding platform, component 514 assigns the category assigned to the element in the native element hierarchy of that platform. For the elements in element hierarchy 504 which are not in the native element hierarchy of the corresponding platform, such as extended element 508 and 512, and the elements derived therefrom, component 514 assigns categories based on a parent element that does appear in the native element hierarchy of that platform.

Component 514 produces categorized element hierarchy output 516. As an example, component 514 categorizes all elements that correspond to a button type element on iOS platform as belonging to "button" category 518. Elements 506A, 506B, 506C, 508A, and 508B are members of category 518. Similarly, component 514 categorizes all elements that correspond to a button type element on Android platform as belonging to "button" category 520. Elements 510A, 510B, 512A, 512B, and 512C are members of category 520.

Figure 6:
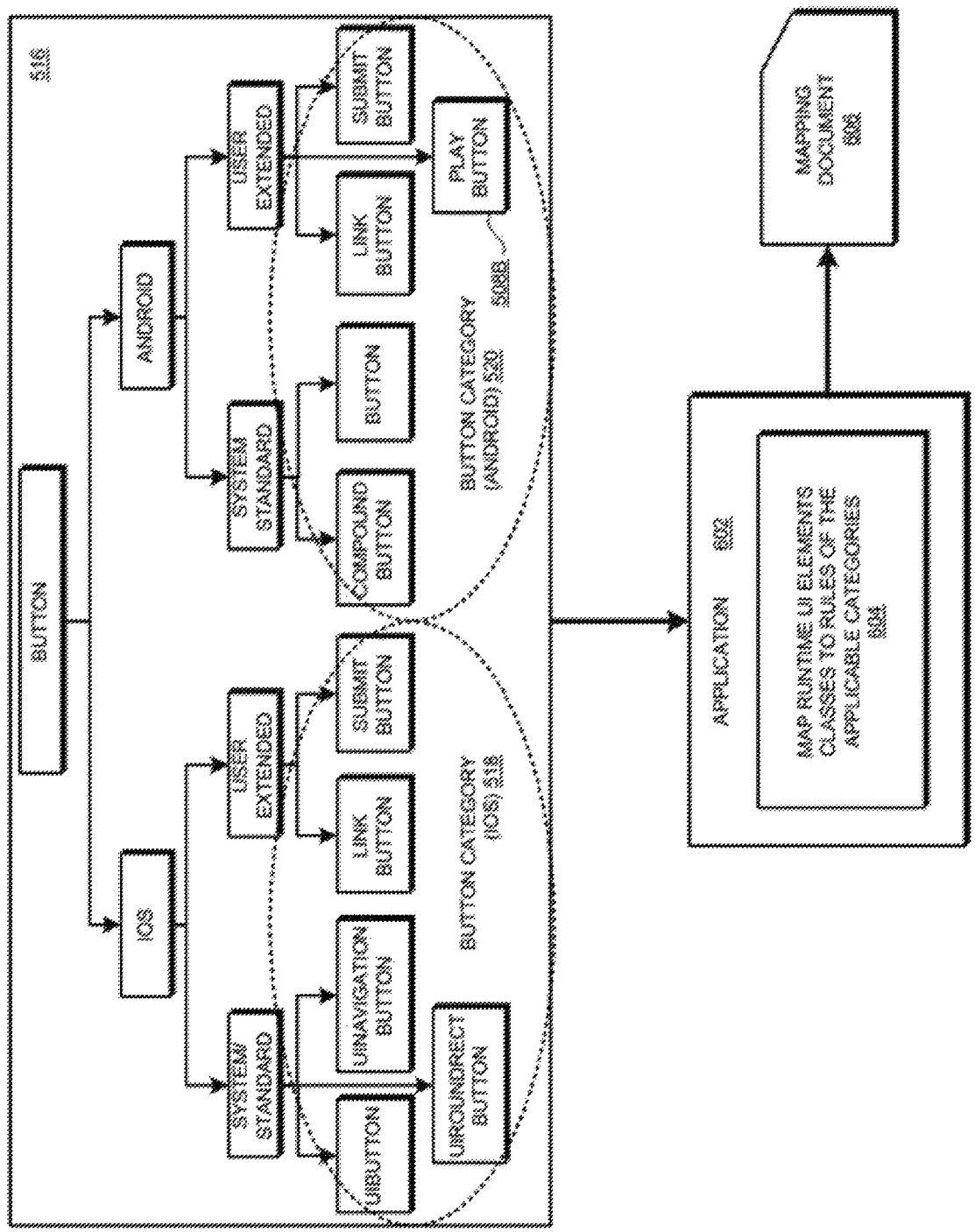
FIG. 6 depicts a block diagram of an example configuration for mapping accessibility compliance rules to runtime categories of UI elements in accordance with an illustrative embodiment.

With reference to FIG. 6, this figure depicts a block diagram of an example configuration for mapping accessibility compliance rules to runtime categories of UI elements in accordance with an illustrative embodiment. Application 602 is an example of application 502 in FIG. 5 with additional features as described herein.

Suppose, as a non-limiting example, that application 602 is processing the UI elements presented at runtime on an iOS platform. Particularly for this example, suppose that the class hierarchy of the runtime UI includes that portion of categorized class hierarchy 516 in FIG. 5, which pertains to iOS.

Further suppose that at the moment, application 602 is processing a button element in the UI, and the button corresponds to extended class 508B.

As described with respect to FIG. 5, element 508B belongs to Button category 518. Accordingly, component 604 finds the subset of rules that correspond to the Button category, e.g., rules 414 and 416 in FIG. 4, and maps the UI element corresponding to element 508B to that subset of rules. Component 604 maps other UI elements at runtime to one or more subsets or categories of rules in a similar manner. Application 602 produces the mapping—or correspondence—of a UI element to a category of accessibility compliance rules as mapping document 606.

Figure 7:
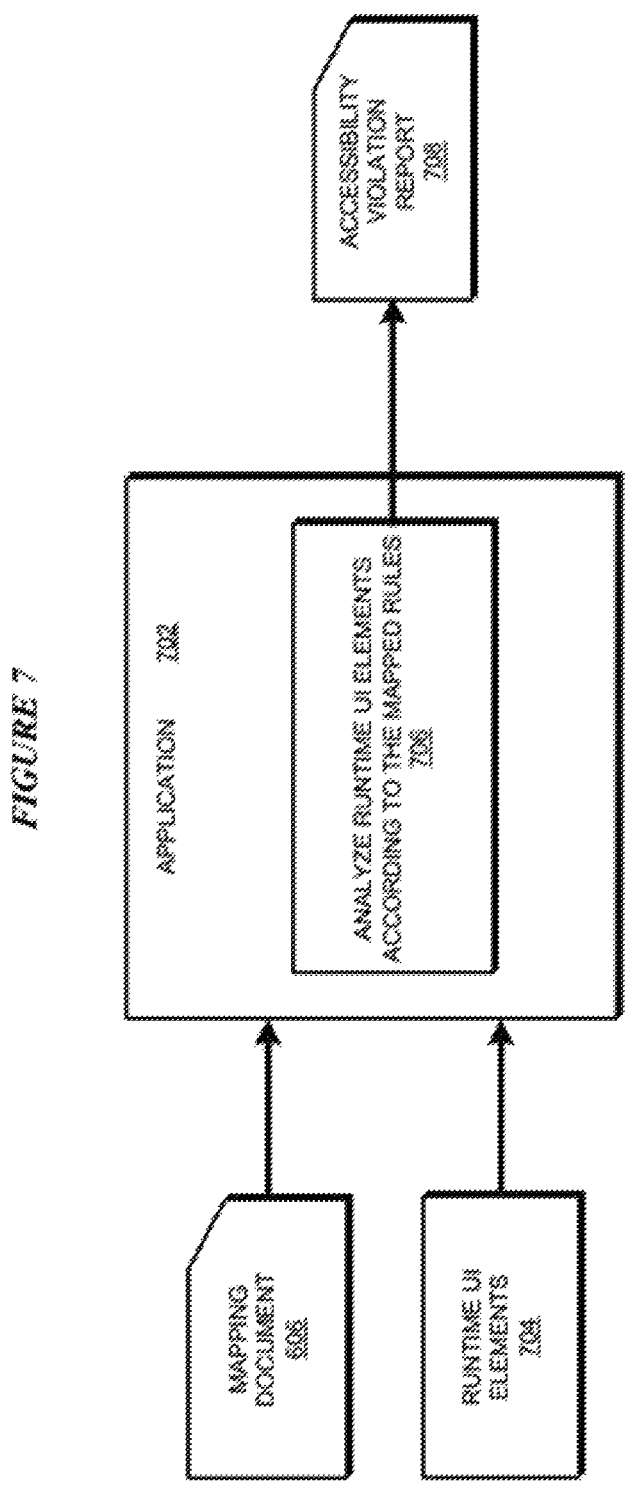
FIG. 7 depicts a block diagram of an example configuration for applying accessibility compliance rules to runtime UI elements in accordance with an illustrative embodiment.

With reference to FIG. 7, this figure depicts a block diagram of an example configuration for applying accessibility compliance rules to runtime UI elements in accordance with an illustrative embodiment. Application 702 is an example of application 602 in FIG. 6 with additional features as described herein.

Application 702 uses as inputs mapping document 606 produced in FIG. 6, and set of runtime UI elements 704, such as according to categorized element hierarchy 516 for a platform, as in FIG. 5. Component 706 analyzes a UI element from set 704 according to a rule corresponding to that UI element by category, as provided in mapping document 606. If the UI element violates the rule or fails to satisfy the rule to a degree or threshold required by the rule, component 706 adds the UI element and the rule violation information to accessibility violation report 708. Component 706 processes each rule from mapping document 606 that corresponds to each UI element from set 704 in a similar manner.

Figure 8:
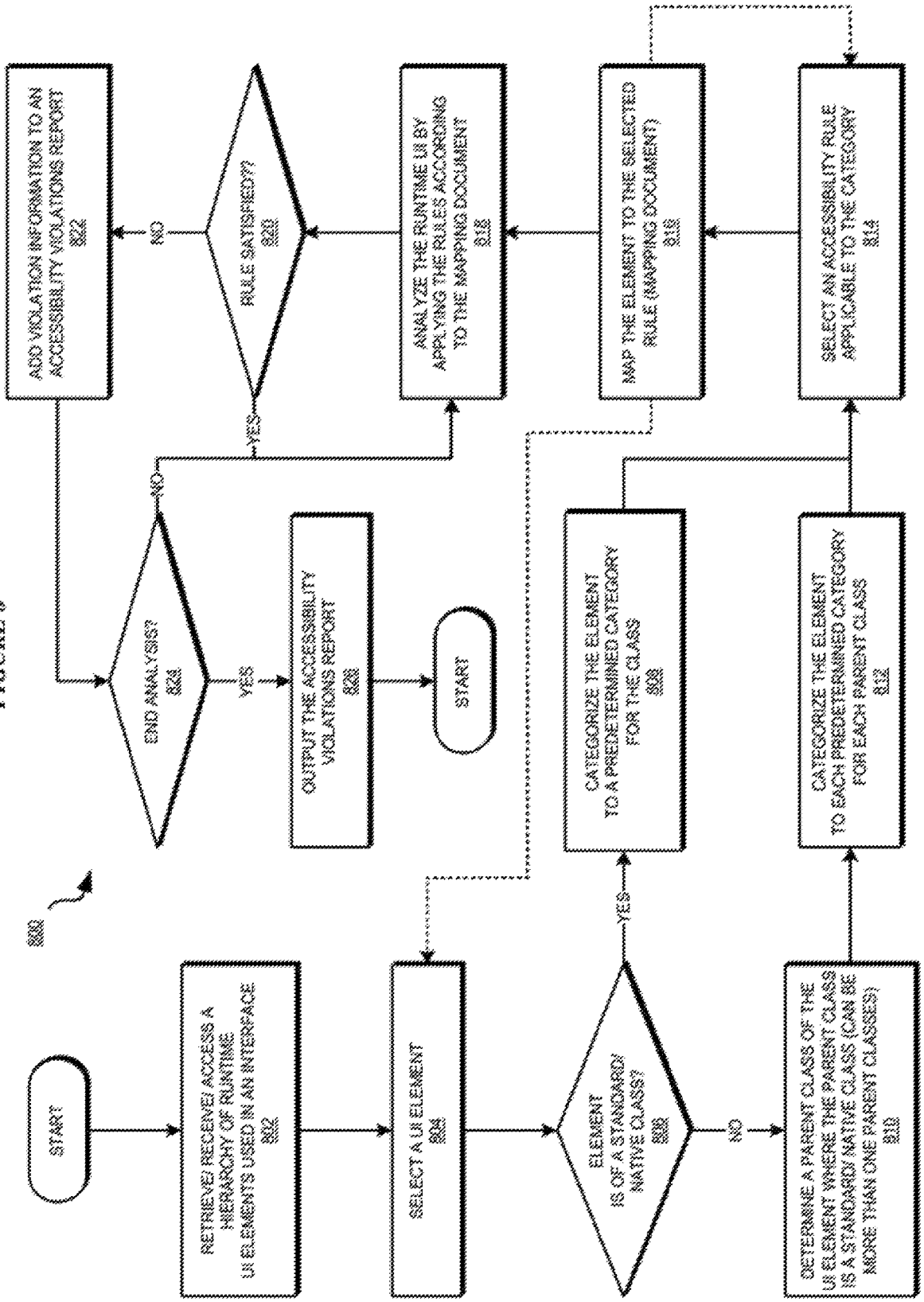
FIG. 8 depicts a flowchart of an example process for runtime evaluation of user interfaces for accessibility compliance in accordance with an illustrative embodiment.

With reference to FIG. 8, this figure depicts a flowchart of an example process for runtime evaluation of user interfaces for accessibility compliance in accordance with an illustrative embodiment. Process 800 can be implemented in application 702 in FIG. 7.

The application accesses a hierarchy of runtime UI elements used in a UI on a platform (block 802). The application selects a UI element (block 804). The application determines whether the selected UI element is a native element or a user-defined element (block 806).

If the selected UI element is a native element ("Yes" path of block 806), the application categorizes the element to a predetermined category for the element (block 808). The application proceeds to block 814 thereafter.

If the selected UI element is a not a system-defined element ("No" path of block 806), the application determines one or more parent class of the UI element where the parent class is a native class in the native class hierarchy of the platform (block 810). The application categorizes the element to each predetermined category for each such parent class of the element (block 812).

The application selects an accessibility rule or a subset of rules that is applicable to the category (block 814). The application maps the selected element to the selected rule or subset of rules (block 816). The application selects each element in the runtime UI and maps to a category of rules in this manner.

The application analyzes the runtime UI by applying the category of rules to a runtime UI element (block 818). The application determines whether the UI element satisfies a rule in the category (block 820). If the UI element satisfies a rule in the category ("Yes" path of block 820), the application returns to block 818 for processing more rules in the category and other UI elements in this manner. If the UI element does not satisfy the rule ("No" path of block 820), the application adds the violation information to an accessibility violation report (block 822).

The application determines whether the analysis of the runtime UI should end, such as when all the UI elements that have mapped subsets of rules have been analyzed in this manner (block 824). If the analysis has to continue ("No" path of block 824), the application returns to block 818 for processing more rules in the category and other UI elements in this manner.

If the analysis can end ("Yes" path of block 824), the application outputs the accessibility violation report (block 826). The application ends process 800 thereafter.

Figure 9:
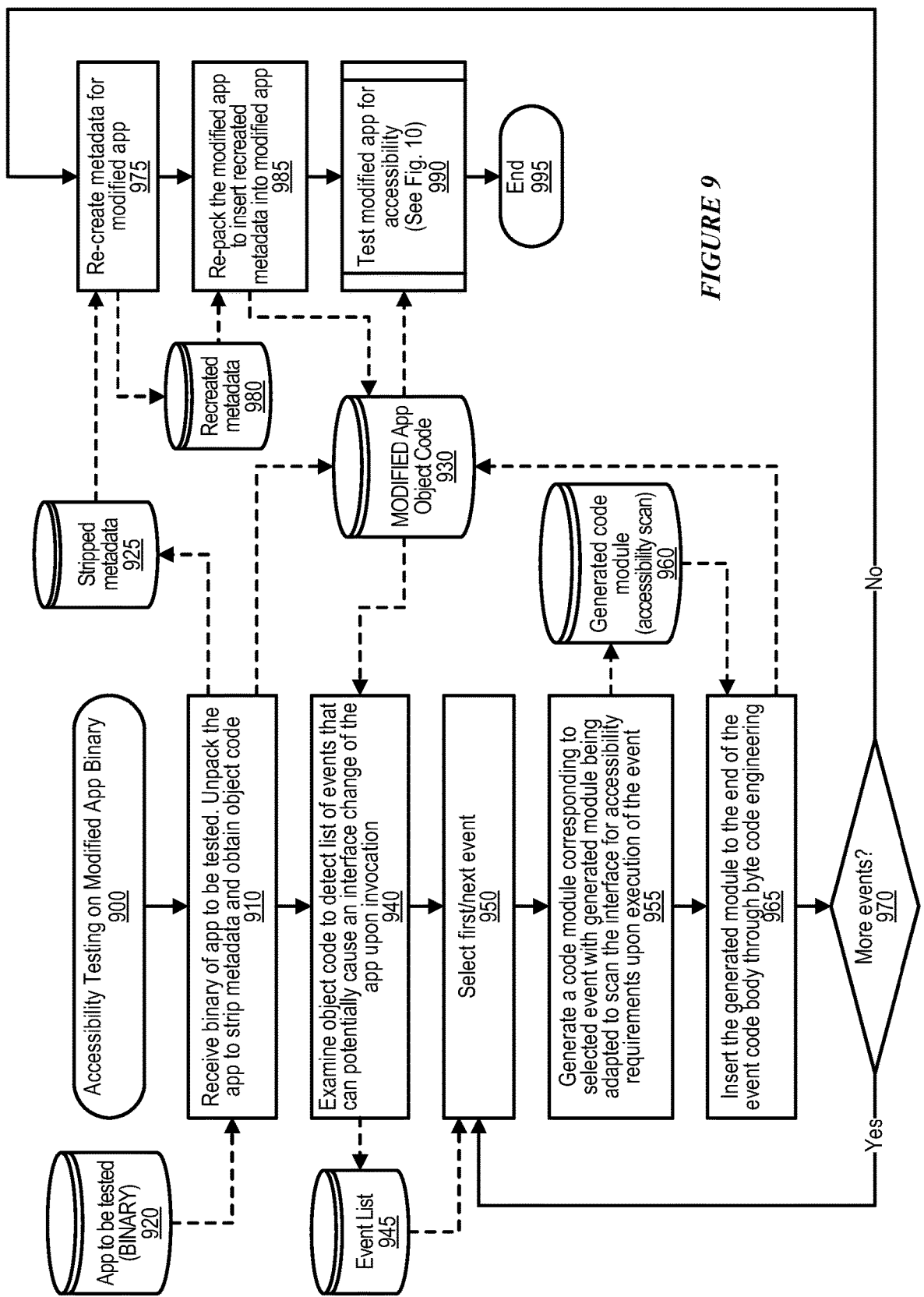
FIG. 9 depicts a flowchart of an example process for modifying application binary to insert generated code modules that scan the modified binary, during execution for accessibility compliance.

With reference to FIG. 9, this figure depicts a flowchart of an example process for modifying application binary to insert generated code modules that scan the modified binary, during execution for accessibility compliance. FIG. 9 processing commences at 900 and shows the steps taken by a process that performs accessibility testing using modified application binary. At step 910, the process receives the binary executable of the application to be tested for accessibility requirements. The binary executable of the application is retrieved from data store 920. At step 910, the process unpacks the application to strip out metadata from the application binary and obtain the binary object code from the binary executable of the application. The stripped metadata is retained in data store 925 where it will eventually be used for recreation of the metadata that may be modified and repacked into the modified binary. The binary (object) code from the binary executable of the application is stored in data store 930.

At step 940, the process examines the object code of the application (stored in data store 930) to detect a list of events that can potentially cause an interface change of the application upon invocation of the events. The list of events is stored in data store 945.

At step 950, the process selects the first event from data store 945. At step 955, the process generates a code module corresponding to the selected event with the generated code module being adapted to scan the interface corresponding to the event for accessibility requirements when the event is executed. At step 965, the process inserts the generated code module to the the event code in modified binary of the application 930. The generated code module is inserted into the modified binary code of the application through byte code engineering. The process determines as to whether there are more events that were detected for which code modules need to be generated as described above (decision 970). If there are more events that were detected, then decision 970 branches to the 'yes' branch which loops back to step 950 to select and process the next event from event list 945 as described above. This looping continues until all of the events have been processed, at which point decision 970 branches to the 'no' branch exiting the loop.

Figure 10:
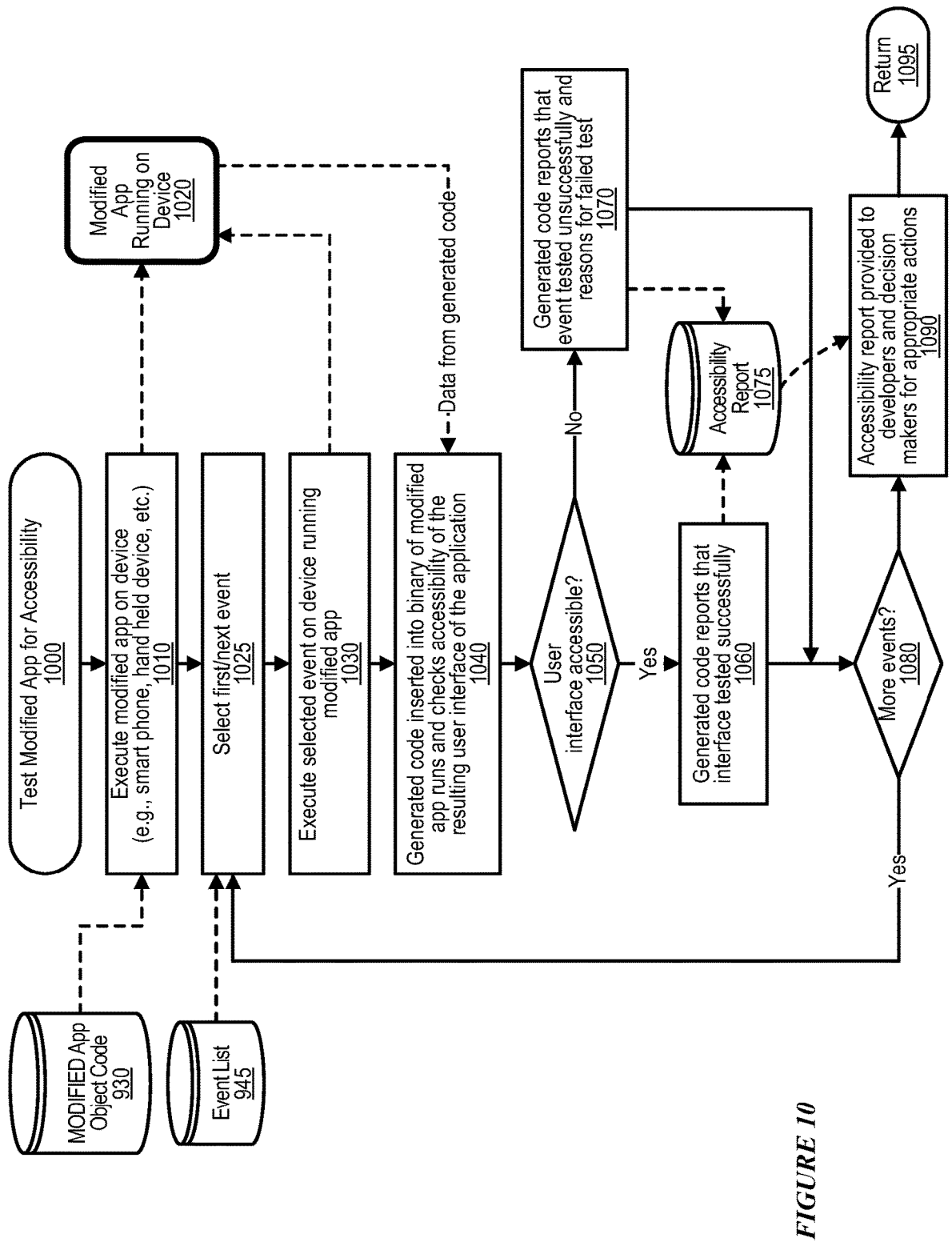
FIG. 10 depicts a flowchart of an example process for testing the modified application binary for accessibility compliance by using data received from the generated code modules during execution of the modified binary code.

At step 975, the process re-creates the metadata for modified app. Step 975 retrieves the metadata that was stripped from the binary executable of the application and stored in data store 925. The metadata might be modified during an event process. The recreated metadata is stored in data store 980. At step 985, the process re-packs the modified binary of the application to insert the recreated metadata back into the modified binary of the application. At this point, the modified binary of the application is in executable form and ready for testing on the target device that is a platform for the binary executable of the application, such as a smart phone, other hand held device, or other type of information handling system. At predefined process 990, the process performs the Test Modified Application Binary for Accessibility routine (see FIG. 10 and corresponding text for processing details). As shown in FIG. 10, during execution of the modified binary of the application, the generated code modules are executed and these code modules compare the interface with a set of accessibility requirements to inform developers and other decision makers as to whether the binary executable of the application meets such accessibility requirements. FIG. 9 processing thereafter ends at 995.

With reference to FIG. 10, this figure depicts a flowchart of an example process for testing the modified application binary for accessibility compliance by using data received from the generated code modules during execution of the modified binary code. FIG. 10 processing commences at 1000 and shows the steps taken by a process that tests the modified binary of the application to determine whether it meets accessibility requirements. Since the difference between the modified binary of the application and the binary executable of the application is the insertion of generated code modules that evaluate the interfaces for accessibility requirements, the results of the testing are applicable to the executable of the application and the testing will reveal which interfaces in the application need to be address for accessibility issues.

At step 1010, the process retrieves the modified binary of the application from data store 930 and executes the modified binary on device 1020. For example, the application may be designed to operate on a particular smart phone platform, other handheld device platform, or other information handling system platform. As the application runs in a device, the event is executed either as a result of user interaction or as a result of a system event (like timer). At step 1025, the first event from data store 945 is executed. At step 1030, the process executes the selected event on the device that is running the modified binary of the application. As previously described with regard to FIG. 9, the event corresponds to an interface that may be subject to accessibility requirements. At step 1040, the modified binary of the application running on device 1020 executes the generated code that was inserted into binary of modified application runs and checks the accessibility of the resulting user interface of the application.

The process determines as to whether the selected event resulted in a user interface that passed the accessibility requirements (decision 1050). If the selected event resulted in a user interface that passed the accessibility requirements, then decision 1050 branches to the 'yes' branch to perform step 1060 whereupon the modified binary of the application running on device 1020 executes the generated code that reports that the interface tested successfully with the successful result being included in a set of accessibility data that is received and stored in data store 1075. On the other hand, if the user interface failed one or more accessibility requirements, then decision 1050 branches to the 'no' branch to perform step 1070 whereupon the modified binary of the application running on device 1020 executes the generated code that reports that the event tested unsuccessfully with the failure results being included in a set of accessibility data that is received and stored in data store 1075. This set of accessibility data can also include the one or more accessibility requirements that were not met by the interface corresponding to the tested event.

The process determines as to whether there are more events in the modified binary of the application to test on device 1020 (decision 1080). If there are more events to test, then decision 1080 branches to the 'yes' branch which loops back to step 1025 to select and test the next event as described above. This looping continues until all of the events have been tested, at which point decision 1080 branches to the 'no' branch exiting the loop. At step 1090, accessibility report 1075 is provided to developers and other decision makers for appropriate actions regarding any failures found in the application with regard to accessibility requirements. FIG. 10 processing thereafter returns to the calling routine (see FIG. 9) at 1095.

Thus, a computer implemented method, system or apparatus, and computer program product are provided in the illustrative embodiments for runtime evaluation of user interfaces for accessibility compliance. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to the consumer by executing the application on a cloud infrastructure. The application is accessible from various client devices through a thin client interface such as a web browser (e.g., web-based e-mail). The user does not manage or control the underlying cloud infrastructure including network, servers, operating systems, storage, or even the capabilities of the application, with the possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   identifying one or more interface changing events in the binary executable of an application;
   generating one or more code modules, wherein each of the generated code modules is directed at evaluating one or more accessibility requirements pertaining to one or more of the identified interface changing events;
   creating a modified binary of the application, wherein the modified binary includes the binary executable and the generated code modules;
   stripping a set of metadata from the binary executable before creating the modified binary;
   retrieving the set of metadata;
   recreating the set of metadata after creating the modified binary that includes the binary executable and the generated code modules; and
   executing the modified binary, wherein upon execution of a selected one of the identified interface changing events,
   a selected one of the generated code modules is executed and returns a set of accessibility data pertaining to the selected interface changing event.

2. The method of claim 1 further comprising:
repacking the modified binary to include the binary executable, the generated code modules, and the recreated set of metadata.

3. The method of claim 1 further comprising:
examining the binary executable of the application to detect a list of the identified interface changing events, wherein the generated code modules are adapted to scan an interface corresponding to the interface changing events for accessibility requirements upon execution of the identified interface changing events.

4. The method of claim 1 further comprising:
loading the modified binary onto a handheld device that is an intended platform of the binary executable of the application, wherein the modified binary is executed using the handheld device.

5. The method of claim 1 wherein execution of the modified binary further comprises:
running the selected code module, wherein the selected code module scans an interface corresponding to the selected interface changing event and compares the interface with a set of one or more accessibility requirements;
detecting, by the selected code module, that the interface fails one or more of the accessibility requirements; and
reporting a failure of the interface based on the detection in the set of accessibility data.

6. The method of claim 5 further comprising:
including one or more failure reasons, based on the comparison of the interface with the accessibility requirements, in the reporting of the failure.

7. The method of claim 1 wherein execution of the modified binary further comprises:
running the selected code module, wherein the selected code module scans an interface corresponding to the selected interface changing event and compares the interface with a set of one or more accessibility requirements;
detecting, by the selected code module, that the interface passed each of the one or more of the accessibility requirements; and
reporting a success of the interface based on the detection in the set of accessibility data.

8. An information handling system comprising:
one or more processors;
a memory coupled to at least one of the processors; and
a set of computer program instructions stored in the memory and executed by at least one of the processors in order to perform actions comprising:
identifying one or more interface changing events in the binary executable of an application;
generating one or more code modules, wherein each of the generated code modules is directed at evaluating one or more accessibility requirements pertaining to one or more of the identified interface changing events;
creating a modified binary of the application, wherein the modified binary includes the binary executable and the generated code modules;
stripping a set of metadata from the binary executable before creating the modified binary;
retrieving the set of metadata;
recreating the set of metadata after creating the modified binary that includes the binary executable and the generated code modules; and
executing the modified binary, wherein upon execution of a selected one of the identified interface changing events,
a selected one of the generated code modules is executed and returns a set of accessibility data pertaining to the selected interface changing event.

9. The information handling system of claim 8 wherein the actions further comprise:
repacking the modified binary to include the binary executable, the generated code modules, and the recreated set of metadata.

10. The information handling system of claim 8 wherein the actions further comprise:
examining the binary executable of the application to detect a list of the identified interface changing events, wherein the generated code modules are adapted to scan an interface corresponding to the interface changing events for accessibility requirements upon execution of the identified interface changing events.

11. The information handling system of claim 8 wherein the actions further comprise:
loading the modified binary onto a handheld device that is an intended platform of the binary executable of the application, wherein the modified binary is executed using the handheld device.

12. The information handling system of claim 8 wherein execution of the modified binary further comprises:
running the selected code module, wherein the selected code module scans an interface corresponding to the selected interface changing event and compares the interface with a set of one or more accessibility requirements;
detecting, by the selected code module, that the interface fails one or more of the accessibility requirements; and
reporting a failure of the interface based on the detection in the set of accessibility data.

13. The information handling system of claim 12 wherein the actions further comprise:
including one or more failure reasons, based on the comparison of the interface with the accessibility requirements, in the reporting of the failure.

14. The information handling system of claim 8 wherein execution of the modified binary further comprises:
running the selected code module, wherein the selected code module scans an interface corresponding to the selected interface changing event and compares the interface with a set of one or more accessibility requirements;
detecting, by the selected code module, that the interface passed each of the one or more of the accessibility requirements; and
reporting a success of the interface based on the detection in the set of accessibility data.

15. A computer program product stored in a computer readable storage medium, comprising computer program code that, when executed by an information handling system, performs actions comprising:
identifying one or more interface changing events in the binary executable of an application;
generating one or more code modules, wherein each of the generated code modules is directed at evaluating one or more accessibility requirements pertaining to one or more of the identified interface changing events;
creating a modified binary of the application, wherein the modified binary includes the binary executable and the generated code modules;
stripping a set of metadata from the binary executable before creating the modified binary;
retrieving the set of metadata;

recreating the set of metadata after creating the modified binary that includes the binary executable and the generated code modules; and executing the modified binary, wherein upon execution of a selected one of the identified interface changing events, a selected one of the generated code modules is executed and returns a set of accessibility data pertaining to the selected interface changing event.

16. The computer program product of claim 15 wherein the actions further comprise:

repacking the modified binary to include the binary executable, the generated code modules, and the recreated set of metadata.

17. The computer program product of claim 15 wherein the actions further comprise:

examining the binary executable of the application to detect a list of the identified interface changing events, wherein the generated code modules are adapted to scan an interface corresponding to the interface changing events for accessibility requirements upon execution of the identified interface changing events.

18. The computer program product of claim 15 wherein the actions further comprise:

loading the modified binary onto a handheld device that is an intended platform of the binary executable of the application, wherein the modified binary is executed using the handheld device.

19. The computer program product of claim 15 wherein execution of the modified binary further comprises:

running the selected code module, wherein the selected code module scans an interface corresponding to the selected interface changing event and compares the interface with a set of one or more accessibility requirements;

detecting, by the selected code module, that the interface fails one or more of the accessibility requirements; and reporting a failure of the interface based on the detection in the set of accessibility data.

20. The computer program product of claim 19 wherein the actions further comprise:

including one or more failure reasons, based on the comparison of the interface with the accessibility requirements, in the reporting of the failure.

* * * * *